UNITED STATES PATENT OFFICE.

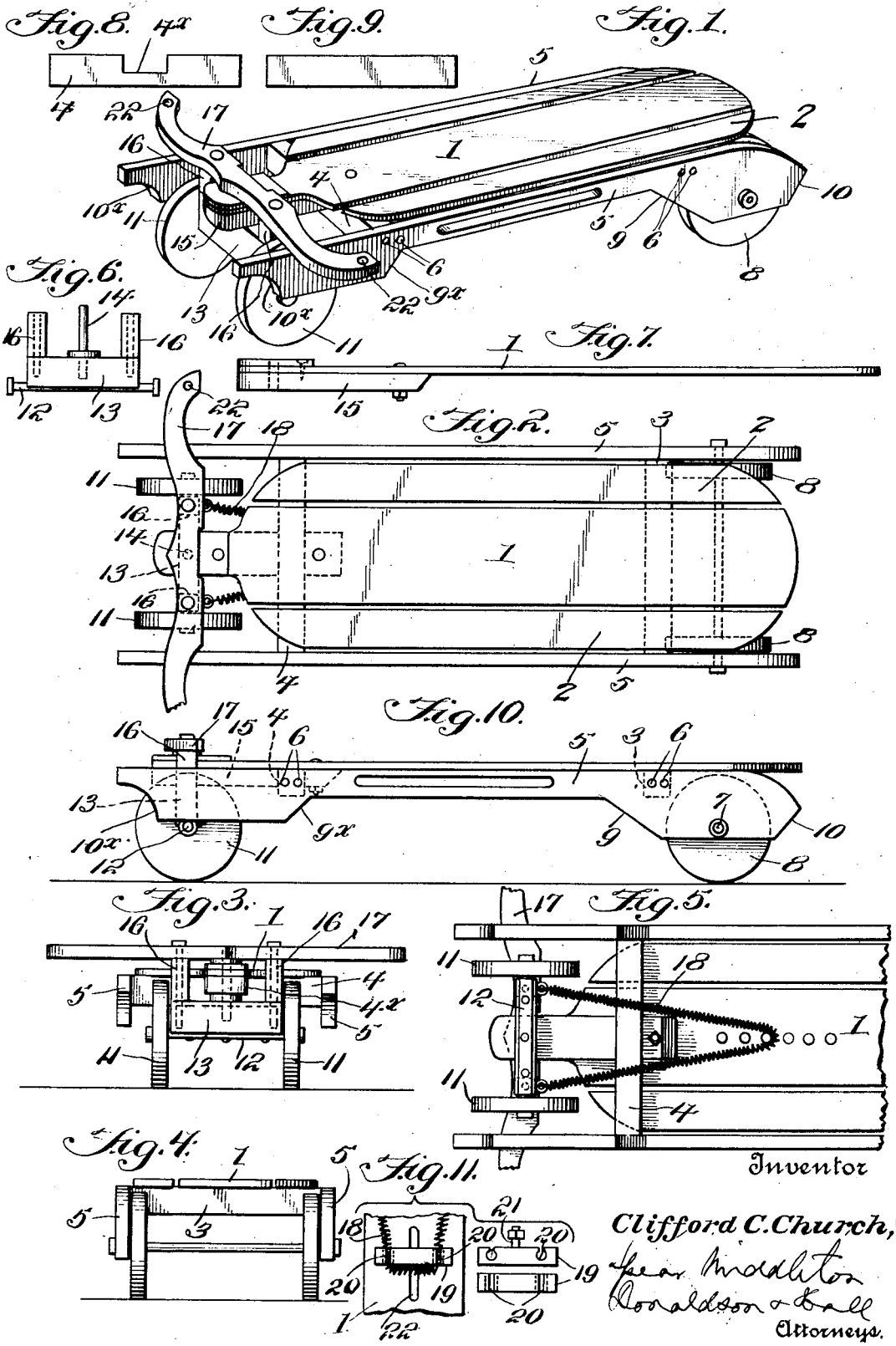

CLIFFORD C. CHURCH, OF BOSTON, MASSACHUSETTS.

CHILD'S VEHICLE.

1,364,612.   Specification of Letters Patent.   Patented Jan. 4, 1921.

Application filed January 28, 1920. Serial No. 354,723.

*To all whom it may concern:*

Be it known that I, CLIFFORD C. CHURCH, a citizen of the United States, and a resident of the city of Boston, State of Massachusetts, have invented certain new and useful Improvements in Children's Vehicles, of which the following is a specification.

It is the object of my invention to provide a low wheeled vehicle having the characteristics of a steering sled but mounted upon low wheels instead of upon runners. In carrying out my invention I have aimed to provide a simple construction in which the wheels of small diameter will be well protected and enabled to pass over obstructions of greater height than the wheel itself, and in which also the steering mechanism will be shielded against damage by reason of collision or otherwise.

Figure 1 is a perspective view of the low wheeled vehicle.

Fig. 2 is a plan view.

Fig. 3 is a front view.

Fig. 4 is a rear view.

Fig. 5 is a bottom plan view of the front portion of the device.

Fig. 6 is a front view of the front axle with its support and means for the attachment of the steering arm.

Fig. 7 is a side view of one of the body members.

Fig. 8 is a view of a front cross support.

Fig. 9 is a view of the rear cross support.

Fig. 10 is a side view of the side guard arm and

Fig. 11 detailed views of an adjusting block.

The body of the vehicle may be made up in different ways but as an illustration I employ a central board 1 and narrow adjacent strips 2, this board with the strips being secured at their rear end to a cross support 3 and at their front portions to a cross support 4.

At the sides of the vehicle there are frame members or boards 5 set up on edge and these are secured at 6 by screws or pins to the ends of the cross supports 3 and 4. These side guards or frames support the axle 7 of the rear wheels 8, which axle may be held in place by nuts, pins or by riveting or by any suitable means. The side guards or frames 5 for the purpose of affording supports for the rear axle are of full depth at their rear portions, but immediately in front of the plane of the forward periphery of the rear wheels there is provided on each side guard or arm, an incline extending upwardly and forwardly at 9, and there is a like incline 10 at the extreme rear end of the side guard or frame member 5. These inclines have their lower ends in a horizontal plane slightly below the axle of rear wheel and they act as skidding surfaces to receive the impact or thrust of any obstruction which is in the path of the wheel so as to exert a lifting action as the vehicle is drawn or pushed when these inclines strike the obstruction so that notwithstanding the fact that the rear wheels may have, say, only three inches radius they will be enabled to pass over obstructions substantially as high as the wheel itself. The rear incline 10 will be useful when the vehicle drops off a curb so as to let the same fall or slide down easily and without undue shock or strain upon the wheel and its axle.

The front wheels 11 are supported by an axle 12 secured preferably to the under side of a main cross member or axle 13 consisting of a comparatively heavy wooden piece. This cross beam 13 is provided with a king pin 14 extending through a block 15 connected with the center board body designated at 1 and before described. The cross beam 13 also has blocks 16 secured thereto near the wheels 11 and to these blocks the steering arm 17 is secured, which steering arm also pivots about the king bolt or pin 14. The construction is such that the force applied to the outer ends of the steering arms 17 which arms reach about five inches beyond the sides of the vehicle, will be transmitted to the steering axle through the blocks 16, at points close to the steering wheel 11 so that the king bolt will be relieved of strain.

The position of the side guards or frames relative to the steering mechanism will be seen from Fig. 3 where 5 indicates these side guards. From Fig. 2 and also Fig. 1 it will be seen that the side guards project toward the front and beyond the forward peripheries of the steering wheels and consequently to a point in front of the steering axle and the steering arm 17 so that these forward extensions of the side guards will act as buffers to protect the whole steering mechanism and the steering wheels.

These side guards or frames have skidding surfaces or edges 9ˣ and curves or inclines at 10ˣ, and these skidding surfaces will bear on an obstruction despite the fact that the obstruction may be higher than the center of the steering wheel. As before stated, the side guards consist of planks or boards set up edgewise and although wheels of small diameter are employed, good clearance is afforded between the vehicle and the ground by the construction of the side guards or frames which are comparatively narrow in height at their center portions as indicated in Fig. 1.

In order to hold the steering mechanism normally for running directly ahead, I provide a spring or springs 18 attached to the front axle or to the cross beam or to the steering handle and this spring or springs are held by a clip 19 having openings at 20 to receive the spring, the said clip being held by a lock screw 21 passing through a slot 22 in the center board, which slot enables the tension of the springs to be adjusted by setting it forward or backward.

As indicated in Fig. 10, the front cross piece 4 of the main frame is notched at 4ˣ to receive the block 15 of the center board or plank forming the body of the vehicle. The vehicle may be pulled by ropes attached at 22 to the steering rod or handle or the user may place his foot on the steering rod or he may manipulate it by grasping it with his hands.

It will be understood that the invention may be embodied in different forms, the one shown being illustrative of the principles involved in my invention and is not to be regarded as restrictive upon the scope of my invention.

It will be noticed that the center board 1 is reduced at its forward end and that this leaves considerable space between this reduced portion and the side boards 5 so that the connecting members or blocks 16 have ample room for movement as the cross handle is turned either one way or the other. The front axle and the front wheels in all the angular positions assumed by them lie in the space between the two side boards and never cross the vertical planes in which these side boards lie. The blocks 16 act as stops to limit the angular movement of the front steering axle and the front steering wheels, and therefore, the wheels will not turn far enough to cause too sharp a turn which would result in the overturning of the vehicle at high speed. These stops will allow enough turning movement of the front steering axle to make a proper turn around a corner but not enough to allow the wheels to jam against the center part of the body and act as a brake to stop the motion of the vehicle. These stops perform a further function in that they limit the extent to which the sides of the spring 18 will be stretched. It is desirable to employ a light spring and therefore it is necessary to prevent stretching of this spring to a point where it would soon lose its life by becoming set.

The tension of the spring is such that the steering axle will yield to force applied to either one end of the long steering cross bar or the other, so that the vehicle readily can be steered even while empty. The spring, however, is of such force as to return the steering axle to its crosswise position for forward running as soon as the pressure at the ends of the steering cross bar is removed.

This construction will enable a small child to steer the vehicle through doorways and among furniture, and adapts the vehicle for use indoors. The long cross bar not only provides a good leverage for steering but also provides by its projecting ends bumpers which will yield on striking an article of furniture or a door frame.

Having thus described my invention, what I claim is:

1. In combination in a child's wheeled vehicle, a body, a steering axle, a king bolt mounted in the body and on which the axle turns, a wheel at each end of the steering axle, a steering bar extending across and above the body and connections between the said steering cross bar and the axle at points intermediate the king bolt and the steering wheels, whereby pressure exerted upon the steering cross bar is transmitted to the steering axle through the said connections to turn the said axle on the king bolt, substantially as described.

2. In combination in a vehicle of the class described, a body, wheels upon which the said body is mounted, a steering axle carrying a pair of said wheels, a steering cross bar, and spring means for holding the cross bar and front axle substantially transverse to the body for normal forward running, said spring having its ends connected to the axle, and means for adjusting the said spring, said adjusting means engaging the loop portion thereof, substantially as described.

3. A vehicle of the class described comprising a body composed of a top board and side boards, the latter being arranged in vertical planes, said top board having a reduced forward end, a front axle, a king bolt upon which said front axle is pivoted, said king bolt being carried by the forward reduced part of the top, said forward reduced part having a space at each side thereof and between the same and the side boards, a steering handle extending across the body of the vehicle at its forward end and connections between the said steering handle and the axle extending down through the said spaces, the said side boards extending along the outer sides of the front wheels and serving as guards therefor, substantially as described.

4. A child's wheeled vehicle having a top and depending sides, rear wheels, risers on the depending sides at the front of the rear wheels, a front steering axle, a king bolt connected with the top of the vehicle on which the front axle turns, the said depending sides extending along the outside of the front steering wheels, substantially as described.

5. A child's wheeled vehicle comprising a body, rear wheels, a front steering axle with a wheel at each end, a steering cross bar extending beyond the sides of the vehicle, adapted to have the ends of a pulling rope attached thereto at its ends for drawing the vehicle, and spring means for restoring the steering axle to position for forward running after the vehicle has been steered by light force applied on one end of the steering bar or the other, substantially as described.

6. A child's wheeled vehicle comprising a frame having a top, a front steering axle, wheels mounted thereon, a steering cross bar and stops on the steering axle to come against a portion of the frame to limit the angular position of the front steering axle, substantially as described.

7. A child's wheeled vehicle comprising a frame having a top, a front steering axle, wheels mounted thereon, a steering cross bar and stops on the steering axle to come against a portion of the frame to limit the angular position of the front steering axle, said stops connecting the axle and steering cross bar.

8. A child's wheeled vehicle comprising a body, rear wheels, a front steering axle with a wheel at each end, a steering cross bar extending over and close to the body and projecting beyond the sides thereof, said cross bar being adapted to have the ends of a pulling rope attached thereto at its ends for controlling the vehicle, an adjustable spring means for restoring the steering axle to position for forward running after the vehicle has been steered by light force applied at one end of the steering bar or the other, substantially as described.

9. A child's low wheeled vehicle having a top, a rear axle and rear wheels, a front steering axle with a wheel at each end thereof, a steering cross bar above the top, and depending sides supporting the rear axle and on the inner side of which the rear wheels are located and supported, said depending sides having risers immediately at the front of the rear wheels and having forward extensions lying outside of and projecting beyond the steering wheels to act as bumpers, the said steering wheels being free to assume angular positions in the space between said forward extensions.

10. A child's low wheeled vehicle having a top, a rear axle and rear wheels, a front steering axle with a wheel at each end thereof, a steering cross bar above the top and depending sides supporting the rear axle and on the inner side of which the rear wheels are located and supported, said depending sides having risers immediately at the front of the rear wheels and having forward extensions lying outside of and projecting beyond the steering wheels to act as bumpers, the said steering wheels being free to assume angular positions in the space between said forward extensions, said steering cross bar extending beyond the sides of the vehicle and adapted to have the ends of a pulling rope attached thereto at its ends for drawing the vehicle and spring means for restoring the steering axle to position for forward running, substantially as described.

11. A child's low wheeled vehicle having a flat top, a front steering axle mounted at the front of said top and having a wheel at each end thereof, depending sides extending along the outside of the steering wheels and a steering cross bar elevated in respect to the top, with a clear space between said cross bar and the top, said steering cross bar being accessible to the child lying prone upon the top, substantially as described.

In testimony whereof, I affix my signature.

CLIFFORD C. CHURCH.